United States Patent [19]

Mugele

[11] Patent Number: 5,169,502
[45] Date of Patent: Dec. 8, 1992

[54] INSTALLATION FOR PROCESSING LIQUIDS

[75] Inventor: Kurt-Willy Mugele, Erlangen, Fed. Rep. of Germany

[73] Assignee: Siemens Aktiengesellschaft, Berlin & Munich, Fed. Rep. of Germany

[21] Appl. No.: 613,881

[22] PCT Filed: Apr. 24, 1989

[86] PCT No.: PCT/DE89/00262
§ 371 Date: Nov. 28, 1990
§ 102(e) Date: Nov. 28, 1990

[87] PCT Pub. No.: WO89/12201
PCT Pub. Date: Dec. 14, 1989

[30] Foreign Application Priority Data
May 30, 1988 [DE] Fed. Rep. of Germany ....... 3818376

[51] Int. Cl.$^5$ .............................................. B01D 3/10
[52] U.S. Cl. .................................... 202/182; 202/186; 202/202; 202/205; 202/266; 62/268; 203/25; 203/26; 203/91; 203/DIG. 8; 203/DIG. 20
[58] Field of Search ............... 202/182, 180, 205, 266, 202/186, 202; 203/24, 25, 26, 11, 91, DIG. 8, DIG. 20, DIG. 16; 159/24.1, 24.2; 62/268

[56] References Cited

U.S. PATENT DOCUMENTS

| | | | |
|---|---|---|---|
| 3,226,306 | 12/1965 | Hausner | 159/24.2 |
| 3,236,748 | 2/1966 | Pottharst | 203/26 |
| 3,392,538 | 7/1968 | Mongodin | 62/268 |
| 3,450,601 | 6/1969 | Brown | 203/26 |
| 3,956,072 | 5/1976 | Huse | 202/177 |
| 4,484,457 | 11/1984 | Mugele | 62/500 |
| 4,577,465 | 3/1986 | Olsen et al. | 62/268 |
| 4,580,720 | 4/1986 | Strop et al. | 237/67 |
| 4,710,272 | 12/1987 | Passarelli et al. | 203/24 |

FOREIGN PATENT DOCUMENTS

| | | |
|---|---|---|
| 0058877 | 9/1982 | European Pat. Off. |
| 0088226 | 9/1983 | European Pat. Off. |
| 0095439 | 11/1983 | European Pat. Off. |
| 2492068 | 4/1982 | France |
| 2553500 | 4/1985 | France |

OTHER PUBLICATIONS

Siemens Power Engineering, vol. 2, No. 9/10, Sep. 1980, pp. 298-302: *Humid-Air Testing Unit for the Efficient Application of Liquid-Ring Vacuum Pumps in Humid Processes*, A. Barany, G. Böhm, H. G. Reinhardt.

Informationsschrift "Mechanische Brüden-Kompressoren" der VDI-Gesellschaft Energietechnik, Jan. 1988.

*Primary Examiner*—Wilbur Bascomb, Jr.
*Attorney, Agent, or Firm*—Kenyon & Kenyon

[57] ABSTRACT

An installation for processing liquids having at least one vaporizer used for the process liquid, a condenser arranged downstream from this vaporizer, and a vacuum pump. Additionally, a gas-ring compressor, positioned in the exhaust pipe between the vaporizer and the condenser, presses the vapors from the process liquid through the condenser. The process liquid is vaporized in the vaporizer under a vacuum and the vapors are carried by an exhaust pipe that is connected to the vaporizer through the condenser to the vacuum pump. Also, the process liquid, which is used as the cooling liquid for the condenser, is heated in the condenser and then recycled to the vaporizer.

24 Claims, 2 Drawing Sheets

INSTALLATION FOR PROCESSING LIQUIDS

BACKGROUND OF THE INVENTION

The invention relates generally to an installation for processing liquids and, more particularly to an installation which has at least one vaporizer used for the process liquid, a condenser arranged downstream from this vaporizer, and a vacuum pump. Additionally, a gas-ring compressor, positioned in the exhaust pipe between the vaporizer and the condenser, presses the vapors through the condenser. Also, the process liquid is used as the cooling liquid for the condenser where it is heated and then recycled to the vaporizer. In such an installation, the process liquid is vaporized under a vacuum, and the vapors, which are either in cloud form or exhaust steams, are carried by an exhaust pipe connected to the vaporizer through a condenser to a vacuum pump.

An installation for processing liquid having at least one vaporizer used for the process liquid, a condenser arranged downstream with respect to the liquid flow, and a vacuum pump is disclosed in "SIEMENS POWER ENGINEERING", Vol. 2, no. 9/10, Sep. 1980, pages 298 to 302. In that installation, the vapors are suctioned out of the evaporator boiler by a downstream vacuum pump and are cooled off in a condenser. Due to this configuration, the downstream vacuum pump can have a small structural size. However, the condenser requires a large amount of cooling water in order to cool the vapors from the evaporator boiler. Thus, most of the thermal energy previously supplied to the vaporizer is given off to the environment by transfer to the cooling water of the condenser.

Certain designs for improving the thermal efficiency of liquid processing installations, which include vapor compressors are known. However, these designs require completely re-installing the installations with specially dimensioned installation parts. Such special installation parts are known from the information pamphlet "Mechanical Vapor Compressors" by the VDI Energy Technology Company [VDI-Gesellschaft Energietechnik] of Jan. 1988.

The present invention is directed to the problem of remodeling liquid process installations and thereby considerably improving thermal efficiency, while continuing to use existing installation parts and minimizing installation complexity.

SUMMARY OF THE INVENTION

The present invention solves this problem by providing a gas-ring compressor arranged between the vaporizer and the condenser in the exhaust pipe. Further, the process liquid, which is now used as the cooling liquid in the condenser, is heated in the condenser and returned, heated, to the vaporizer. Because a gas-ring compressor works in an oil-free manner, there is no danger of contaminating the discharged vapors. Additionally, use of the gas-ring compressor enables the installation to economically obtain a higher pressure ratio resulting in more rigorous heating of the vapors. Use of the gas-ring compressor creates a greater heat differential at the condenser resulting in a greater amount of heat transferred to the process liquid, which is flowing through the condenser. Because the process liquid is returned to the vaporizer after accepting the transferred heat, the vaporizer requires considerably less additional thermal energy to vaporize the process liquid. In fact, the heat transferred to the process liquid by the condenser is even sufficient to keep the process in operation. This heat recycling further improves the economic efficiency of the installation. Because both the economic efficiency and operational reliability of the installation are considerably improved with the addition of a gas-ring compressor, remodeling smaller process installations, even those with capacities of under 500 kW, is advantageous.

In an installation constructed according to the present invention, the process liquid is expediently pumped through the condenser by means of a circulating pump. If the vacuum pump of the installation also has a heat exchanger, then the amount of heat recovered can be increased by also directing the process liquid, which already flows through the circulating pump, through the heat exchanger of the vacuum pump.

Positioning the gas-ring compressor and the vacuum pump on a mutual box frame considerably facilitates the remodeling of a liquid processing installation. The external pipe connections required for connecting the gas-ring compressor and the condenser should also be located on the box frame.

If the gas-ring compressor is driven by a steam turbine, the steam produced by the turbine can be used in the installation.

DETAILED DESCRIPTION

Figure 1:
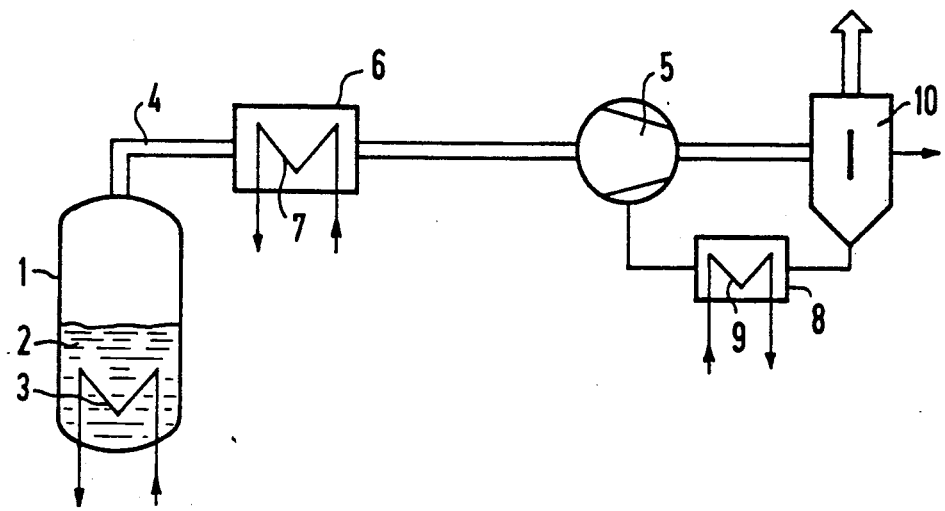
FIG. 1 is a schematic drawing of a known liquid processing installation.

In FIG. 1, a vaporizer 1, is filled with process liquid 2 to be vaporized. If the process is a batch process, then the process liquid 2 is poured into the vaporizer 1 only once, at the beginning of the process. Alternatively, new process liquid 2 is continuously fed into the vaporizer 1. (Batch processing is assumed in the installation depicted in FIG. 1).

The process liquid 2 is heated and vaporized by a heating coil 3 which may be fed by superheated steam. An exhaust pipe 4 is connected to the vaporizer 1. The exhaust pipe 4 leads first to a condenser 6 having a cooling coil 7 then to the vacuum pump 5. A vacuum is generated in the vaporizer 1 by the vacuum pump 5 located in the exhaust pipe 4. The location of the vacuum pump enables the process liquid 2 to be vaporized at relatively low temperatures.

In the installation schematically shown by FIG 1, vapors drawn off from the vaporizer are cooled by cooling water flowing through the condenser 6. This reduction in vapor temperature also reduces vapor volume, thus, the vacuum pump 5 has a smaller structural size than when it is arranged directly downstream of the vaporizer 1 without any condenser 6.

The vacuum pump 5, which can be a liquid-ring pump, has an allocated heat exchanger 8. The vacuum pump 5 may also be a dry running pump that operates in an oil-free manner. The heat exchanger 8 has a cooling coil 9 that is traversed by the flow of cooling water. The vapors that have been compressed to at least atmospheric pressure by the vacuum pump 5 are recovered by a downstream preparation system 10 and reused as process liquid. Any exhaust gases that are produced by the installation are either treated for a further use or are given off to the environment.

Figure 2:
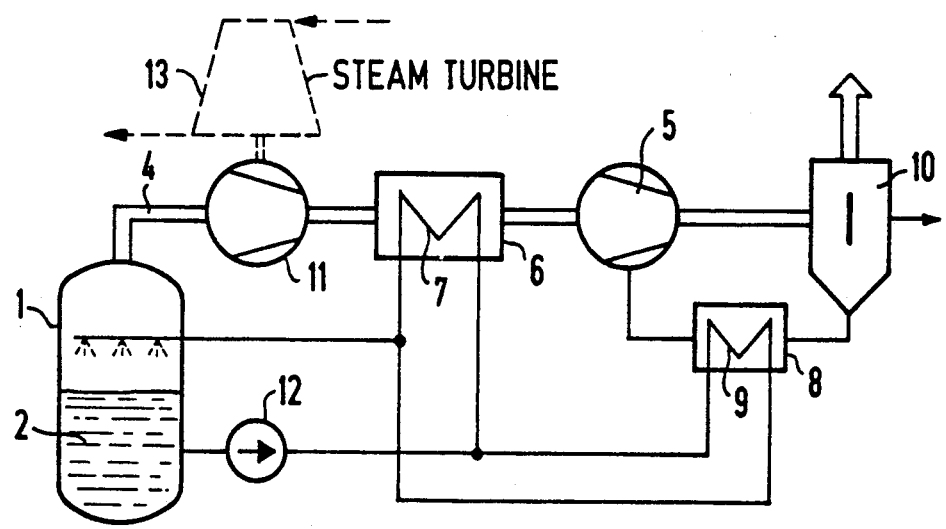
FIG. 2 is a schematic drawing of a liquid processing installation constructed according to the principles of the invention.

FIG. 2 illustrates an installation remodeled in accordance with the principles of the present invention, wherein the heat generated during the process is no longer dissipated to the environment by the cooling water of the condenser but instead is used in the heating of the process liquid 2. The components of the installation depicted by FIG. 2 that conform to the same components of the installation depicted by FIG. 1 are given the same reference symbols as in FIG. 1.

In the installation constructed according the principles of the present invention, a gas-ring compressor 11 is arranged in the exhaust pipe 4 between the vaporizer 1 and the condenser 6. This compressor 11 compresses the vapors suctioned off from the vaporizer 1, thus increasing the heat of the vapors. The use of a gas-ring compressor 11 is particularly advantageous because the vapors are heated more intensively due to a higher pressure ratio which is economically achieved by using the compressor 11. The gas-ring compressor 11 may be driven by a steam turbine 13. The vapors are then subsequently pressed by the gas-ring compressor 11 through the condenser 6. Concurrently, the process liquid 2 is pumped through the condenser's cooling coil 7 by a circulating pump 12. Inside the condenser 6, the process liquid 2 extracts heat from the vapors, again achieving the desired reduction in the volume of the vapors due to the reduction in temperature of the vapors. The heat that is extracted from the vapors is not dissipated to the environment, but instead remains in the installation because the process liquid 2 is recycled from the condenser 6 back into the vaporizer 1.

The cooling coil 9 of the heat exchanger 8 is connected in parallel to the cooling coil 7 of the condenser 6. Thus, the heat transferred to the process liquid 2 from the vacuum pump 5 is also used to heat the process liquid 2.

Remodeling an installation for processing liquids according to the principles of the invention eliminates the need for heat being supplied to the process liquid even at the start of the procedure.

Figure 3:
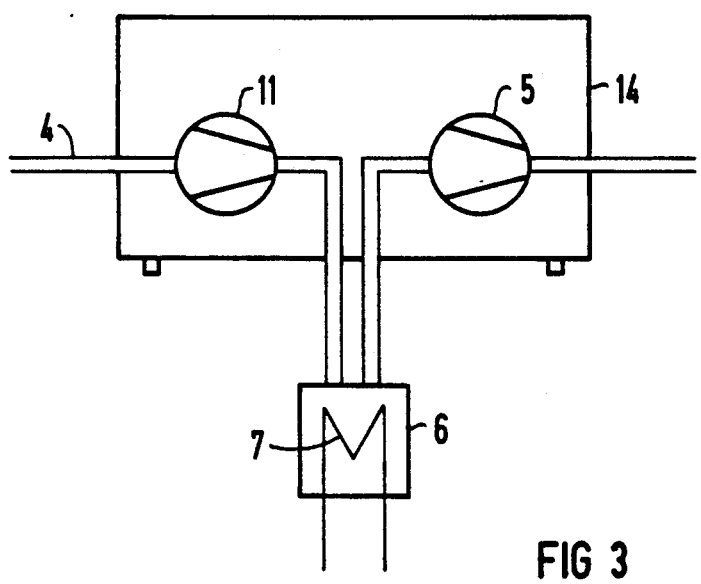
FIG. 3 is a schematic drawing showing the compressor and the vacuum pump of the installation shown in FIG. 2 positioned on a common box frame.

As illustrated by FIG. 2, remodeling an installation for processing liquids only requires the addition of a gas-ring compressor 11. However, a circulating pump 12 is required when the process liquid flow rate from gravitational forces does not produce an adequate heat exchange. The use of a circulating pump 12 also improves the economic efficiency of the installation because a greater amount of heat is exchanged as a result of the higher flow rate generated due to the circulating pump. Additionally, the pipework of an existing installation can be largely retained. However, connections for both the compressor 11 and the circulating pump 12 to the vaporizer will be required, as well as, connections for the vaporizer 1 to the cooling coils 7 and 9 of the condenser 6 and of the heat exchanger 8. As seen in FIG. 3, the compressor 11 and the vacuum pump 5 may be positioned on a common box frame 14.

What is claimed is:

1. An installation for processing liquids comprising:
a vaporizer that vaporizes a process liquid;
an exhaust pipe, said vaporizer connected to said exhaust pipe;
a condenser positioned downstream of said vaporizer, said condenser connected to said exhaust pipe;
a gas-ring compressor, positioned in said exhaust pipe between said vaporizer and said condenser, said gas ring compressor compressing said vapors into said condenser;
a vacuum pump connected to said exhaust pipe and positioned downstream of said condenser;
means for conveying process liquid from said vaporizer to said condenser such that the process liquid cools said condenser; and
means for returning the process liquid from said condenser to said vaporizer.

2. The installation according to claim 1 wherein said means for conveying process liquid includes a circulating pump for pumping process liquid from said vaporizer to said condenser.

3. The installation according to claim 2 wherein said vacuum pump includes a heat exchanger, and further comprising means for recirculating process liquid from said vaporizer, through said heat exchanger, and back to said vaporizer.

4. The installation according to claim 1 wherein said vacuum pump is a dry running pump and is oil-free.

5. The installation according to claim 2 wherein said vacuum pump is a dry running pump and is oil-free.

6. The installation according to claim 3 wherein said vacuum pump is a dry running pump and is oil-free.

7. The installation according to claim 1 further comprising a mutual box frame having external pipe connections for connecting said gas-ring compressor and said condenser, and wherein said gas-ring compressor and said vacuum pump are positioned on said mutual box frame.

8. The installation according to claim 2 further comprising a mutual box frame having external pipe connections for connecting said gas-ring compressor and said condenser, wherein said gas-ring compressor and said vacuum pump are positioned on said mutual box frame.

9. The installation according to claim 3 further comprising a mutual box frame having external pipe connections for connecting said gas-ring compressor and said condenser, wherein said gas-ring compressor and said vacuum pump are positioned on said mutual box frame.

10. The installation according to claim 4 further comprising a mutual box frame having external pipe connections for connecting said gas-ring compressor and said condenser, wherein said gas-ring compressor and said vacuum pump are positioned on said mutual box frame.

11. The installation according to claim 5 further comprising a mutual box frame having external pipe connections for connecting said gas-ring compressor and said condenser, wherein said gas-ring compressor and said vacuum pump are positioned on said mutual box frame.

12. The installation according to claim 6 further comprising a mutual box frame having external pipe connections for connecting said gas-ring compressor and said condenser, wherein said gas-ring compressor and said vacuum pump are positioned on said mutual box frame.

13. The installation according to claim 1 further comprising a steam turbine for driving said gas-ring compressor.

14. The installation according to claim 2 further comprising a stream turbine for driving said gas-ring compressor.

15. The installation according to claim 3 further comprising a steam turbine for driving said gas-ring compressor.

16. The installation according to claim 4 further comprising a steam turbine for driving said gas-ring compressor.

17. The installation according to claim 5 further comprising a steam turbine for driving said gas-ring compressor.

18. The installation according to claim 6 further comprising a steam turbine for driving said gas-ring compressor.

19. The installation according to claim 7 further comprising a steam turbine for driving said gas-ring compressor.

20. The installation according to claim 8 further comprising a steam turbine for driving said gas-ring compressor.

21. The installation according to claim 9 further comprising a steam turbine for driving said gas-ring compressor.

22. The installation according to claim 10 further comprising a steam turbine for driving said gas-ring compressor.

23. The installation according to claim 11 further comprising a steam turbine for driving said gas-ring compressor.

24. The installation according to claim 12 further comprising a steam turbine for driving said gas-ring compressor.

* * * * *